United States Patent
Keller

(10) Patent No.: US 6,675,800 B2
(45) Date of Patent: Jan. 13, 2004

(54) EMERGENCY FLIGHT SAFETY DEVICE

(75) Inventor: Leo Keller, Bertschikon (CH)

(73) Assignee: Optrel AG, Wattwil (CH)

( * ) Notice: Subject to any disclaimer, the term of this patent is extended or adjusted under 35 U.S.C. 154(b) by 179 days.

(21) Appl. No.: 09/773,087

(22) Filed: Jan. 31, 2001

(65) Prior Publication Data

US 2001/0010225 A1 Aug. 2, 2001

(30) Foreign Application Priority Data

Feb. 1, 2000 (EP) ............................................ 00101939

(51) Int. Cl.⁷ ................................................. A62B 7/00
(52) U.S. Cl. ........................... 128/205.23; 128/201.24; 128/206.21; 345/7; 345/8
(58) Field of Search ...................... 128/205.23, 201.24, 128/202.22, 206.21, 206.24, 205.25, 202.11; 345/7, 8, 9

(56) References Cited

U.S. PATENT DOCUMENTS

| | | | | |
|---|---|---|---|---|
| 4,559,939 A | * | 12/1985 | Levine et al. | 128/201.15 |
| 4,651,728 A | * | 3/1987 | Gupta et al. | 128/201.28 |
| 4,741,332 A | | 5/1988 | Beaussant | |
| 4,766,893 A | * | 8/1988 | Drews | 128/201.23 |
| 4,875,477 A | * | 10/1989 | Waschke et al. | 128/206.21 |
| 4,897,715 A | * | 1/1990 | Beamon, III | 345/8 |
| 5,091,719 A | * | 2/1992 | Beamon, III | 345/8 |
| 5,318,250 A | * | 6/1994 | Werjefelt | 128/201.23 |
| 5,355,878 A | * | 10/1994 | Griffiths et al. | 128/201.23 |
| 5,540,218 A | * | 7/1996 | Jones et al. | 128/201.24 |
| 5,575,278 A | * | 11/1996 | Bonhomme et al. | 128/201.29 |
| 5,601,078 A | | 2/1997 | Schaller et al. | |
| 5,612,708 A | * | 3/1997 | Ansley et al. | 340/980 |
| 5,649,532 A | * | 7/1997 | Griffiths | 128/201.23 |
| 5,764,203 A | * | 6/1998 | Holmlund et al. | 345/8 |
| 5,903,397 A | * | 5/1999 | Melville et al. | 345/8 |
| 5,913,307 A | * | 6/1999 | Taieb et al. | 128/202.22 |
| 6,297,749 B1 | * | 10/2001 | Smith | 340/980 |
| 6,369,779 B1 | * | 4/2002 | Bartlett | 345/8 |

FOREIGN PATENT DOCUMENTS

| | | |
|---|---|---|
| EP | 0 252 281 A1 | 1/1988 |
| EP | 0 301 997 A2 | 2/1989 |

OTHER PUBLICATIONS

Patent Abstracts of Japan, Publication No. 08317318, Publication Date: Nov. 29, 1996, Title: Information Transmitter.

* cited by examiner

Primary Examiner—Weilun Lo
Assistant Examiner—Darwin P. Erezo
(74) Attorney, Agent, or Firm—Rankin, Hill, Porter & Clark LLP

(57) ABSTRACT

An emergency flight safety device for flight crew members (3) of an aircraft in an emergency situation. The device includes a full-face mask (1) and a display (31) that is integrated into the full face mask (1). The display shows flight data and ensures that the crew (3) has access to essential information even in the case when smoke otherwise largely blurs the view in the aircraft cabin. The emergency flight safety device also includes an oxygen and air supply apparatus (14–18) for supplying oxygen and air to the interior of the mask (1). The oxygen and air supply apparatus (14–18) includes a purification device to purify polluted cabin air in order to prevent the crew members (3) from being intoxicated by poisonous smoke.

10 Claims, 4 Drawing Sheets

EMERGENCY FLIGHT SAFETY DEVICE

FIELD OF THE INVENTION

The present invention relates to an emergency flight safety device for a person in the cockpit of an aircraft, the device including a full-face mask and an integrated display with at least one display area for displaying flight data.

BACKGROUND OF THE INVENTION

Recent incidents in civil and military aviation that were initialized by fire, fume or smoke resulting from malfunctioning electrical appliances or wiring, have caused tremendous loss of human life and substantial financial damage. In an emergency situation it is vital that the pilot of an aircraft have a clear view of the critical flight information data, full control over the orientation of the aircraft in the three-dimensional space, and proper breathing conditions in case of loss of cabin pressure or health-critical fume. In addition, the safety of an emergency landing is substantially enhanced when the pilot has an undisturbed view of the final touchdown spot.

Information displaying methods according to the state of the art, however, fail to provide the pilot with the critical flight information data in certain emergency situations, especially in situations where smoke has developed. State of the art is either described as dedicated breathing equipment against nuclear, biological or chemical contamination (NBC protection equipment), as e.g. disclosed in U.S. Pat. No. 4,741,332, or as improvement of a helmet mounted display by means of a specific cathode ray tube installation, as e.g. disclosed in EP-A-0 301 997. The European Patent Application publication 0 252 281 and the U.S. Pat. No. 5,601,078 disclose a not specifically determined breathing apparatus that can be used underground or in non-airborne embodiments. Attached to the breathing mask, on the outside, a removable, mask mounted monocular display is disclosed, capable of displaying measured data of low complexity with the help of a dedicated illumination system.

All these information-displaying methods have in common that they do not allow a pilot to fly an aircraft in emergency situations involving heavy smoke.

Existing emergency devices for airplanes have concentrated on providing the cockpit crew members with smoke goggles and an oxygen mask in case of loss of cabin pressure (see, e.g., D. Wilkins "Helmet Mounted Displays in Transport Emergency Conditions". SPIE Conference on Helmet- and Head-Mounted Displays IV, SPIE Vol. 3689, 206–209, 1999). Alternatively, full-face masks have been used to protect the pilot's eyes from smoke (R. Stünkel "All you need is oxygen" Fliegermagazin 9/99, 32–35, September 1999) or the combination of a breathing mask with a protective hood that can enclose the pilot's head (U.S. Pat. No. 5,115,804) have been proposed. The disadvantage of all these approaches is the reduced visibility under heavy smoke conditions. Smoke drastically reduces the readability of instruments located in the instrument flight panel. As a possible solution to this problem, Wilkins discusses an inflatable plastic shield over the instrument panel that may help to somewhat reduce the amount of smoke between the operator and the panel. Alternatively, a separate, head mounted display could directly provide the crew members with critical flight information. For situations in which the visibility is reduced to less than a few centimeters and in order to prevent eye irritation because, such a display is preferably combined with some sort of smoke goggles. This latter approach is then, within certain limits, also suitable for situations in which the smoke contamination is strong and the instrument representation has to be very close to the human eye.

The above-mentioned solutions fail to suggest an appropriate integrated safety device approach. Such a safety device should allow the wearer in emergency situations not only to have access to certain information, but to indeed pilot an aircraft if the view is completely blurred and if the surrounding air is contaminated or toxic. It should, in addition, be possible to be made independent of the cockpit power supply in the case of a power failure or a deliberate switching off of the power supplies during emergency procedures.

SUMMARY OF THE INVENTION

It is a purpose of the present invention to provide an emergency flight safety device that overcomes disadvantages of present safety devices and especially enables the pilot to safely land an aircraft which is troubled by a smoke incident.

The emergency flight safety device according to the invention comprises a full-face mask with a see-through, multifunctional display. The device may be quickly deployed, and therefore allows immediate control over the aircraft by the cockpit crew in the case of an emergency. The integration of the head-mounted display into the full-face mask prevents smoke from disturbing the clear perception of displayed information and avoids eye irritation. It provides an undisturbed vision and access to flight information data as well as safe breathing conditions. Each display area covers a substantial part of the person's field of vision. Therefore, from relevant data such as track, position, speed, altitude and the position of the aircraft in the three dimensional space (inertial navigation data), the pilot can control the aircraft even if he does not see anything of the real world outside at all. By providing this display covering a substantial part of the pilot's view and by providing the opportunity to incorporate stereoscopic vision of visualized data, such as a virtual flight path to an emergency landing strip, in bad weather conditions or at night time by means of an infrared camera placed outside the cockpit, this device is a first step to a virtual cockpit.

In case of the development of health-critical smoke it is important to have access to purified air when cabin air pressure is relatively high. An increasing volume of surrounding cabin air in standard oxygen demand systems is mixed with a decreasing volume of oxygen as soon as the cabin pressure is approaching standard atmospheric pressure (cf Stünkel). The use of such a standard oxygen demand system would thus lead to the intoxication of the crew in case of the development of health critical smoke. The emergency flight safety device according to the invention therefore further comprises an oxygen and air supply apparatus for supplying oxygen and/or air to the interior of the mask i.e. a powered purified air respiratory system, which ensures that no intoxicated air gets into the mask.

In a preferred embodiment of the invention, the multifunctional head-mounted display is structured into a virtual area where critical flight information data is displayed and an area where real data such as video images obtained by an external camera can be overlaid onto critical flight information data, enhancing the perception of an actual situation, especially in the final phase of an emergency landing.

BRIEF DESCRIPTION OF THE DRAWINGS

In the following, an exemplified embodiment of the invention is described in more detail with reference to the attached drawings. In the drawings.

DETAILED DESCRIPTION OF THE PREFERRED EMBODIMENTS

Figure 1:
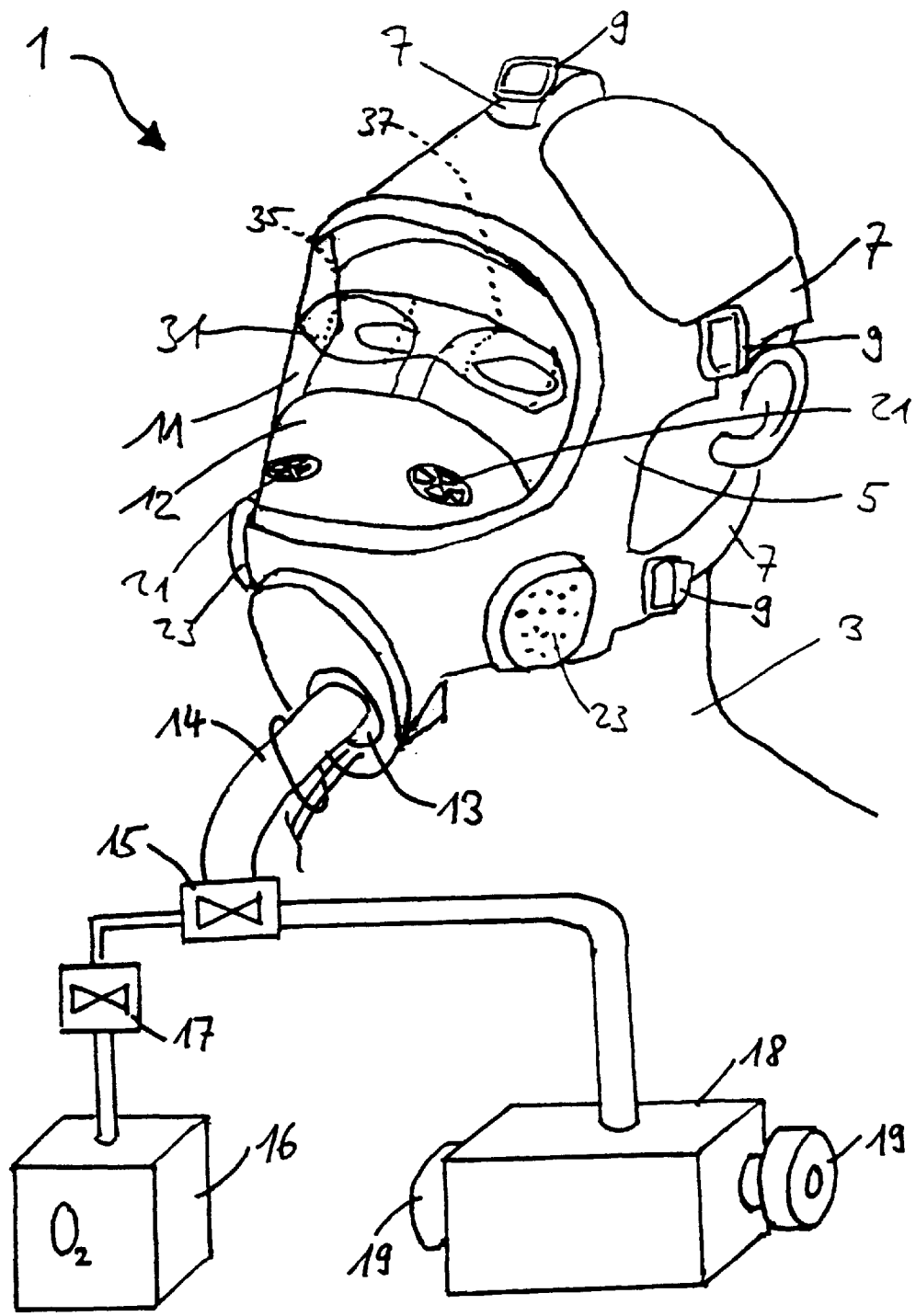
FIG. 1 shows a view of a person wearing a full-face mask according to the invention, comprising an oxygen and purified air supply, of an emergency flight safety device.

The emergency flight safety device described in the following is designed for installation in an aircraft, namely an airplane. A full-face mask 1 belonging to the emergency flight safety device is illustrated in FIG. 1. It is mounted in an airplane cockpit, for instance contained in a dropout package, and can be automatically made available for the cockpit crew in case of an incident such as a sudden cabin-pressure loss, similar to the existing oxygen masks in airplanes.

The full-face mask 1 is configured to effectively shield the entire face of a person 3, e.g., a crew member, from possibly intoxicated cockpit air. It covers essentially the whole face of the person 3 and has an elastically deformable margin section 5 for a smooth yet sealing skin contact. Straps 7 with adjustment buckles 9 serve as means for holding the mask on crew member's face. A view-through section 11 consists of transparent material and allows the person wearing the mask an essentially undisturbed perception under normal conditions, i.e., if the view in the cockpit is not blurred. A nose covering 12 divides the space between the mask 1 and the crew member's face into a viewing space and a breathing space which hermetically includes nose and mouth of the crew member. The mask 1 further comprises a purified air and oxygen supply joint 13 to which a conduit 14 is mounted. This conduit 14 is connected to valve means comprising an oxygen demand valve 15, which in turn is linked to at least one oxygen container and/or oxygen generator 16. The oxygen containers and/or the oxygen generator 16 are of the type used for passenger oxygen masks in existing airplanes. A pressure-reducing valve 17 may be inserted between an oxygen container 16 and the oxygen demand valve 15. The oxygen demand valve 15 is further linked to a powered purified air respiratory device 18. This powered purified air respiratory device comprises filtering means 19 for the filtering of possibly intoxicated cabin air. The oxygen demand valve 15 is configured to switch between supplying the person wearing the mask with oxygen or purified air. The switching may be carried out manually, but the oxygen demand valve 15 may also comprise means for the switching to be carried out automatically, e.g. depending on the pressure loss in the cockpit. As an alternative, the oxygen demand valve may be configured to provide a mixture of oxygen and purified air, the mixing ratio depending on the cockpit air pressure. The conduit 14, the oxygen demand valve 15, the oxygen containers and/or the oxygen generator 16, the pressure reducing valve 17 and the powered purified air respiratory device 18 together constitute an oxygen and purified-air supply tool 14–18. Air and/or oxygen to be inhaled enters from said tool 14–18 through the purified air and oxygen supply joint 13 into the viewing space from where it gets through valves 21 into the breathing space. Air outlets 23 with valves allow the exhaled are to get to the outside.

Figure 2:
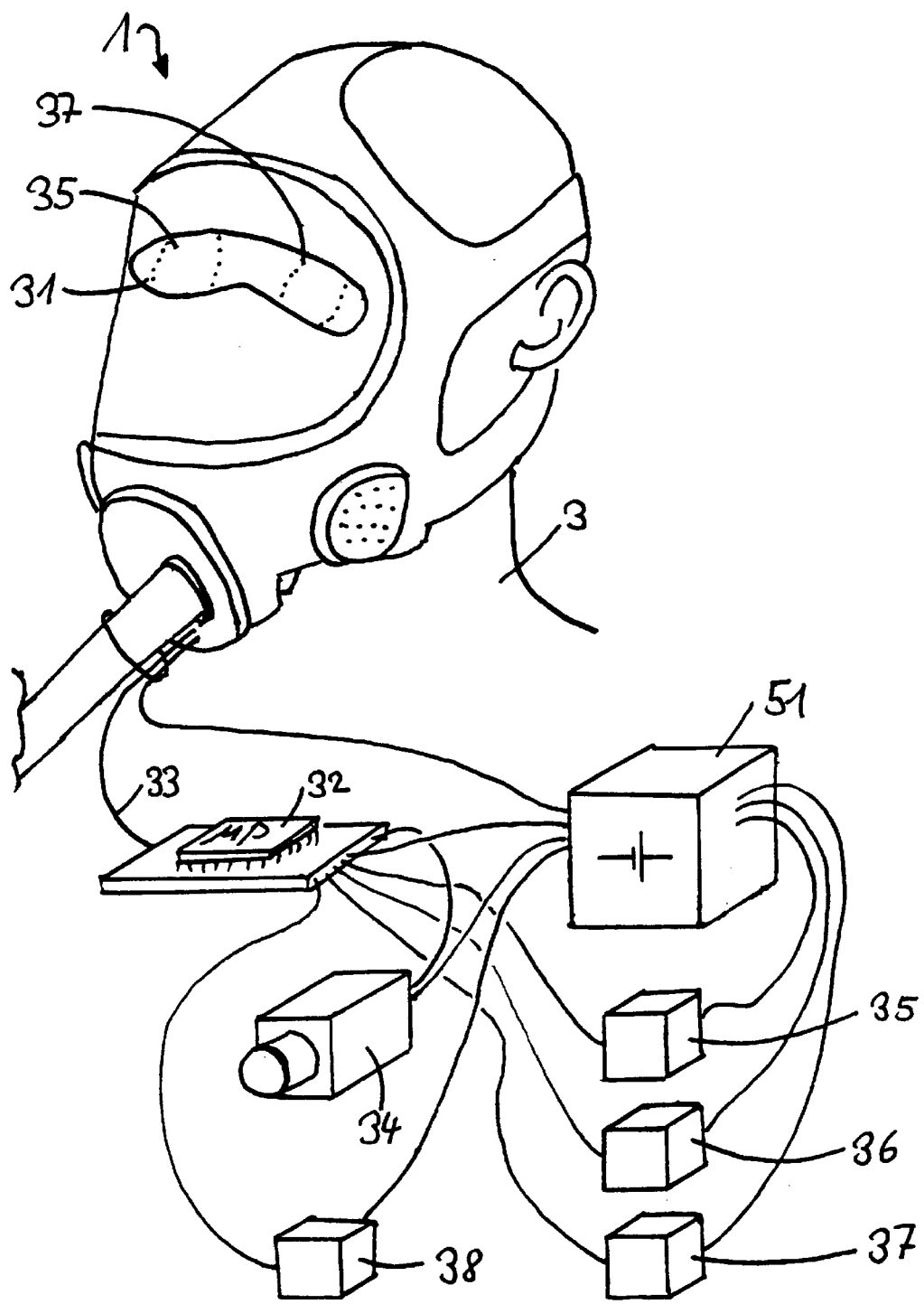
FIG. 2 is a view similar yet more schematic view of a person wearing a full-face mask, additionally showing a simplified scheme of the means for supplying and processing flight data.

The view-through or see-through section 11 of the mask 1 comprises a see-through, multifunctional display 31. The emergency flight safety device is, as schematically shown in FIG. 2, preferably equipped with means 32 for processing of flight data, e.g., a microprocessor or a computer. The thus-processed flight data is submitted by control instruments, such as a GPS/DGPS signal receiver 35, an inertial flight navigation system 36, an aircraft safety data controller 37 or a radio communication interface 38. The emergency flight safety device also comprises means for transmitting flight data from the data processing means 32 to the display 31, e.g., at least one transmission cable 33 connecting the microprocessor or computer 32 and the display 31, the cable 33 being preferably attached to the conduit 14. The display 31 is configured as a liquid-crystal display operated in a projection mode, using adjustable transmission. It preferably consists of two display areas 35, 37 that can be placed in front of and in close proximity to the left and the right eye of the person 3 wearing the mask 1, respectively. In this case, both display areas 35, 37 show essentially the same, slightly shifted display image, providing binocular vision.

Figure 4:
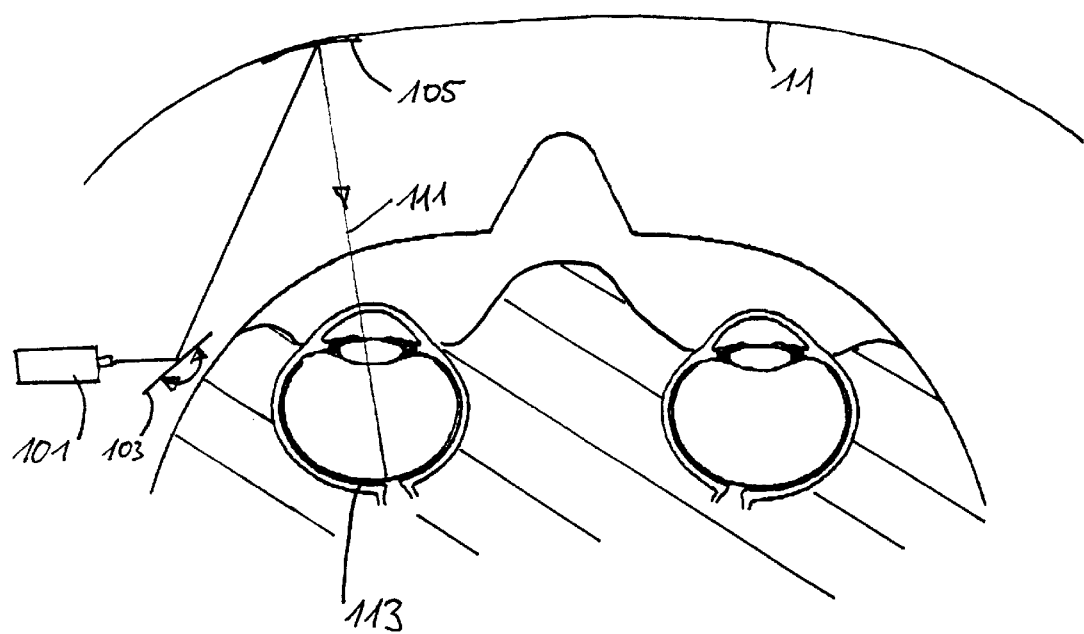

As an alternative to the liquid crystal display, a Direct Laser Beam Writing on the Retina (or Retinal Scanning Display, hereinafter "RSD") can be used. RSD technology is based on the principle that light from a light source with colour determining means is directly, or by an intermediate image, projected onto the retina. In the present set-up, as schematically represented in FIG. 4, a coloured light beam from a laser light source 101 placed behind a plane in front of the eye is projected onto an area with a semitransparent mirror 105 placed in close proximity in front of the eye. By deflection means 103, two-dimensional scanning is achieved. The reflected part 111 of the laser beam is projected onto the retina 113. In this way, an impression of an image covering an (effective) display area is created. The semitransparent mirror may, as an example, be a part of or placed on the view through section 11. The mirrored area thus does not obstruct the person's vision. In the figure, only one RSD set-up for the left eye only is shown. Of course, also an RSD set-up for the right eye may be present. In this way, even a three dimensional impression can be created, if required.

In both cases, if the integrated display is an LCD display or if it is made up of a RSD set-up, it is important that the display areas cover a substantial part of the person's field of vision. This means, that the display area e.g. includes, if the person looks straight ahead, a central part of the field of vision and extends, as an example, from a region left of a vertical middle line to a region right of the vertical middle line. A substantial part is also covered if about 15%, preferably 25% or even at least 35% of the person's field of vision is covered by the display area if the person looks straight ahead.

Figure 3:
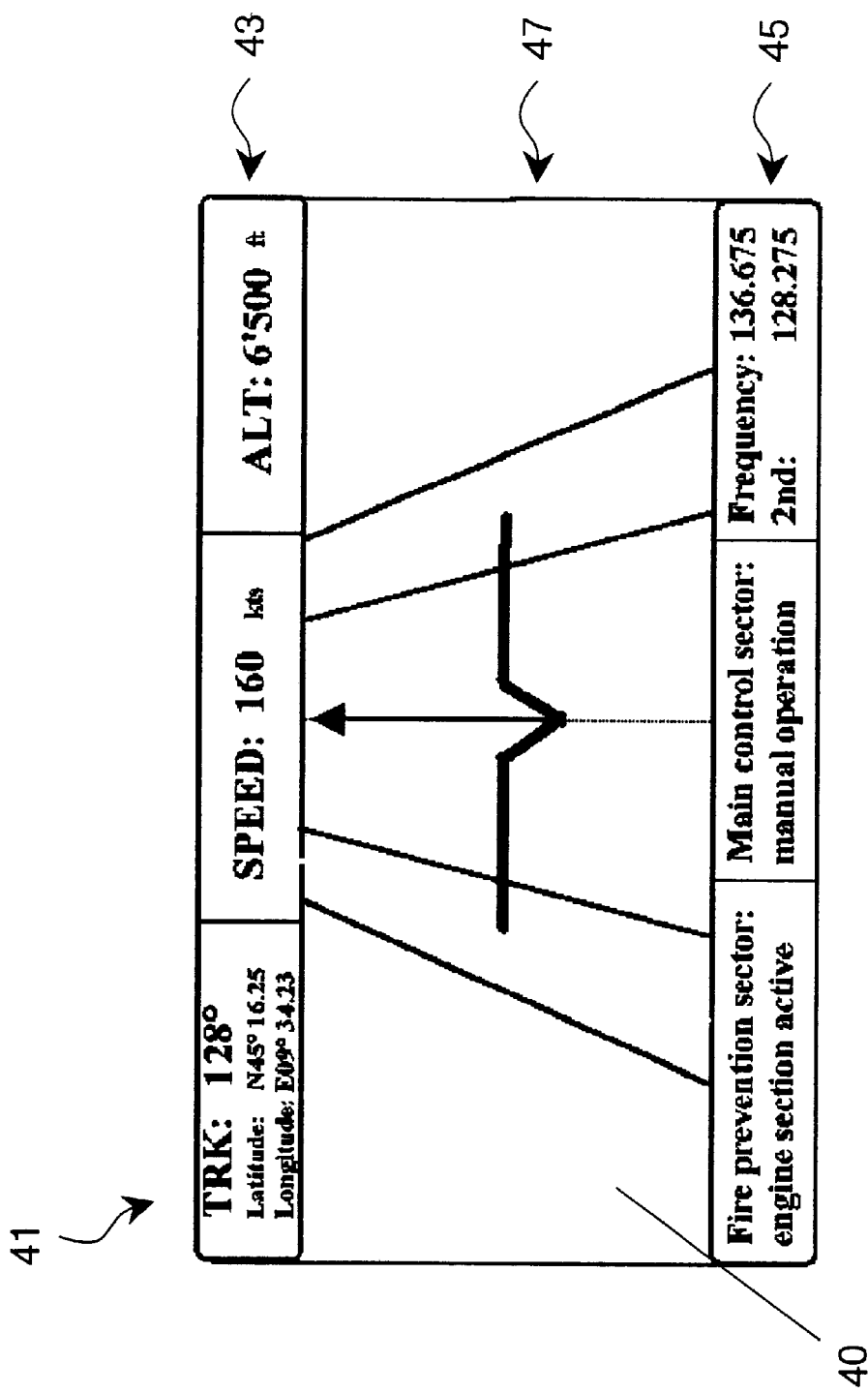
FIG. 3 is a schematic representation of the functions of the device according to the invention with a display panel as seen by the crew member using the device, and FIG. 4 schematically shows in section a person wearing a full-face mask according to one embodiment of the invention.

Two (real or effective) display areas 35, 37 together define one image for the person 3, which is at least partially superposed to the actual view as seen by the person 3 through the view-through section 11 of the mask 1 and which defines a virtual display area 41 as shown in FIG. 3. This virtual display area 41 is used to show GPS (Global Positioning System) and/or DGPS (Differential Global Positioning System) data 43 such as position, track, speed and altitude, giving information about the current position of the aircraft and its track to an emergency landing position. Flight safety system data 45 of the aircraft, such as fire prevention information, power management conditions, and communication frequencies, may also be displayed in the virtual area 41 of the display 31. A center section 40 of the virtual display area 41 is preferably designed as a see-through section used to display data 47 produced by an inertial navigation system, thereby informing the crew about the orientation of the aircraft in the three dimensional space similar to an artificial horizon.

An external imaging device 34, e.g., a camera, can also be part of the emergency flight safety device according to the invention. It can have a visual and/or infrared spectral sensitivity, the latter enhancing visibility in bad weather conditions or at night. This camera 34 is preferably mounted on the bottom side of the airplane such that its field of vision is essentially equivalent to the field of vision of a person viewing through the cockpit window. During an emergency landing, if the view in the cockpit is blurred by smoke, the camera 34 is used to supply real time image data showing the ultimate landing situation, if necessary under enhanced night vision condition. The real time image data may also comprise runway lights, obstacles and/or visual glide path information (Visual Approach Slope Indicator, VASI, or Precision Approach Path Indicator System, PAPI). The image obtained by the camera 34 is shown on the same center section 40 of the virtual display area 41 as the inertial navigation system data 47. Other sensors such as speed or altitude sensors may form part of the emergency flight safety device in the same way as the camera 34.

Preferably, the data displayed on the virtual display area 41 depend on the situation, such as the light conditions, the cockpit atmosphere, etc.

A flight-safety device that works efficiently in various emergency scenarios, such as engine failure, fire, smoke, health-critical fume, electrical failure, and also in deliberate actions under emergency conditions must be powered by a redundant power source that is independent of the main aircraft power source. For this purpose, the emergency flight safety device according to the invention preferably has an auto-power function carried out by an independent and redundant power source 51 (see FIG. 2). The mask 1, the oxygen and purified air supply device 14–18 as well as the sensors such as GPS/DGPS 35, inertial navigation system 36, the aircraft safety system data controller 37, the radio corn interface 38, and the outside camera 34, are included in this independent power management concept. If the sensors are also used by other applications than the emergency flight safety device, their redundant availability is assured by additional independent equipment.

The embodiment described above is by no means the only embodiment of the invention and can be altered or supplemented in many ways. As an example, the means for transmitting data to the display does not have to comprise cables, it can also be equipped with a radio or similar transmission apparatus. In addition to the display 31, also communication equipment such as a headset and a microphone can be integrated in or attached to the full-face mask 1. The mask 1 can further comprise means for the adaptation of the display positioning to the crew member's head size. The crew member's data may even be stored in the computer belonging to the transmission tool so that the exact positioning of the two display areas 35, 37 on the mask 1 can be automatically adapted to the eye position and spacing.

The emergency flight safety device may further be equipped with intelligent means for the matching of the gas composition in the mask to the crew member's needs, which means may comprise sensors mounted on the inside of the full-face mask 1.

What is claimed is:

1. An emergency flight safety device for a person in a cockpit of an aircraft, the device comprising:
    a full face mask including a transparent see-through section (11), said see-through section having an inner surface facing toward a face of the person and an outer surface facing away from the face of the person, said mask being configured to prevent smoke that is outside of said mask from moving between said inner surface and the face of the person;
    a portion of said see-through section defining a display;
    said display covering a substantial part of a field of vision of said person and comprising a display area, said display area being a partially transparent see-through display area that is operable to permit visualization of flight data;
    means for transmitting flight data from an interior of said mask to the display area; and,
    an air supply apparatus that is operable to supply air to the interior of the mask.

2. The emergency flight safety device according to claim 1 wherein the display comprises two display areas, each of said display areas being associated with one of the person's eyes and being operable to project flight data into said associated eye.

3. The emergency flight safety device according to claim 1 wherein the display areas comprise a retinal scanning display whereby flight data information is projected into the person's eye.

4. The emergency flight safety device according to claim 1, further comprising display control means for displaying said flight data on the display area.

5. The emergency flight safety device according to claim 4 wherein said flight data are selected from the group consisting of DGPS/GPS data, positioning data, aircraft speed data, aircraft altitude data, track to nearby airports data, inertial navigation data, aircraft configuration data, and at least one frequency for radio communication with a ground-based flight control.

6. The emergency flight safety device according to claim 1, further comprising a camera for supplying the display with data showing a landing situation, said camera being mountable on the aircraft outside a cabin and having visible, infrared, and visible and infrared spectral sensitivity.

7. The emergency flight device according to claim 1, wherein the air supply apparatus comprises means for purification of smoke-intoxicated cabin air.

8. The emergency flight safety device according to claim 1, wherein the air supply apparatus comprises valve means for supplying the air, and the air comprises oxygen in an amount in a range of from about ambient to about pure oxygen.

9. The emergency flight safety device according to claim 8, wherein the valve means are configured to automatically adjust the amount of oxygen in the air in response to changes in a cockpit air pressure.

10. The emergency flight safety device according to claim 1, further comprising an independent power supply for supplying the emergency flight safety device with electrical power, said independent power supply being independent of a power supply of other electrical equipment.

* * * * *